United States Patent
Hanna et al.

(10) Patent No.: US 6,335,939 B1
(45) Date of Patent: *Jan. 1, 2002

(54) APPARATUS AND METHOD FOR SELECTIVELY SUPPLYING DATA PACKETS BETWEEN MEDIA DOMAINS IN A NETWORK REPEATER

(75) Inventors: Ganatios Y. Hanna, Fremont; Mohan V. Kalkunte, Sunnyvale; Rudolph J. Sterner, Los Altos, all of CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,101

(22) Filed: Aug. 28, 1997

(51) Int. Cl.[7] .......................................... H04J 3/08
(52) U.S. Cl. ............................................. 370/501; 370/226
(58) Field of Search ................... 370/365, 358, 370/471, 486, 405, 232, 420, 392, 235, 226, 285, 390, 401, 407, 402, 368, 501

(56) References Cited

U.S. PATENT DOCUMENTS

| | | | |
|---|---|---|---|
| 5,560,038 A | 9/1996 | Haddock | 395/800 |
| 5,570,366 A | 10/1996 | Baker et al. | 370/85.13 |
| 5,666,359 A * | 9/1997 | Bennett et al. | 370/358 |
| 5,751,952 A * | 5/1998 | Dai et al. | 395/200.8 |
| 5,884,040 A * | 3/1999 | Chung | 395/200.57 |
| 6,002,675 A * | 12/1999 | Ben-Michael et al. | 370/315 |

FOREIGN PATENT DOCUMENTS

| EP | 0 753 950 A | 1/1997 |
|---|---|---|
| WO | WO 97 29573 A | 8/1997 |

* cited by examiner

Primary Examiner—Joe H. Cheng
Assistant Examiner—Kim T. Nguyen

(57) ABSTRACT

A repeater provides an efficient interconnection of an IEEE 802.3 10 Mb/s network with an IEEE 802.3 100 Mb/s network using minimal buffering. The repeater includes a filter that selectively outputs a data packet, received from the 100 Mb/s network, to the 10 Mb/s network based on the destination address in the received data packet. Specifically, the filter passes all data packets in the 10 Mb/s domain to the 100 Mb/s domain. The filter selectively passes the data packet from the 100 Mb/s domain to the 10 Mb/s domain by determining if the received data packet includes a destination address value that specifies transmission of the data packet to the 10 Mb/s network. If the destination address value does not specify a multicast value or an address of a network node in the 10 Mb/s network, the filter discards the data packet.

19 Claims, 2 Drawing Sheets

APPARATUS AND METHOD FOR SELECTIVELY SUPPLYING DATA PACKETS BETWEEN MEDIA DOMAINS IN A NETWORK REPEATER

BACKGROUND OF THE INVENTION

1. Technical Field

The present invention relates to network repeaters, more specifically to an IEEE 802.3 compliant repeater providing a bridge between two media domains.

2. Background Art

Network repeaters are typically used as a bridge between network nodes, for example network stations serving as data terminal equipment (DTE) on different network media. Repeaters provide the advantage of extending the physical distance between network nodes by receiving a data packet from one network media, reconditioning the physical signal, and outputting the data packet to a second network media. The repeater may also forward carrier sense and collision signals, effectively extending the collision domain of one media on to the second media.

Repeaters interconnecting network nodes on different network media have conventionally been configured to connect only networks operating at the same transmission rate. Hence, a repeater would conventionally connect a 10 Mb/s network media to another 10 Mb/s network media, or a 100 Mb/s network media to another 100 Mb/s network media. If the repeater was used to connect the media of two different networks operating at different network speeds, the repeater would require substantially large buffering in order to accommodate the difference in transmission rates without loss of data packets.

SUMMARY OF THE INVENTION

There is a need for an arrangement for interconnecting different speed packet switched networks using a repeater, without the necessity of substantially large buffering.

There is also a need for a network repeater configured for interconnecting different speed networks that selectively controls transmission of data packets between the networks to reduce the necessity of large buffers without losing data packets.

These and other advantages are attained by the present invention, where a filter selectively outputs a data packet received from one network media domain to another network media domain, having a slower transmission rate, based on the destination address specified in the received data packet.

According to one aspect of the present invention, a network repeater comprises first network ports, each configured for outputting a first received data packet to the remaining first network ports, the first network ports sharing a first media domain having a first transmission rate, second network ports, each configured for outputting a second received data packet to the first network ports and the remaining second network ports, the second network ports sharing a second media domain having a second transmission rate less than the first transmission rate, and a filter selectively outputting the first received data packet to the second network ports for transmission on the second media domain based on a destination address specified in the first received data packet. Use of the filter to selectively output the first received data packet to the second network ports enables the first and second media domains to be connected without causing congestion on the second network port. Moreover, the selective output minimizes the amount of buffering necessary between the first and second media domain.

Another aspect of the present invention provides a method in a network repeater including the steps of receiving in a first network port a first data packet from a first media having a first transmission rate, supplying the first data packet to a second network port, coupled to a second media having a second transmission rate greater than the first transmission rate, for transmission on the second media, receiving in the second network port a second data packet from the second media, determining if the second data packet includes a destination address value specifying transmission of the second data packet to at least one network node in communication with the first media, and selectively supplying the second data packet to the first network port for transmission on the first media based on the destination address value determined as specifying transmission to the at least one network node. The determination of whether the second data packet is to be transmitted to the network node on the first media based on the destination address value ensures that data packets transmitted on the first media are not unnecessarily transmitted on the first media. Hence, the collision domains of the first and second media can be connected without substantial buffering within the repeater and without overwhelming the first media, even though the second media operates at a data rate faster than the first media.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
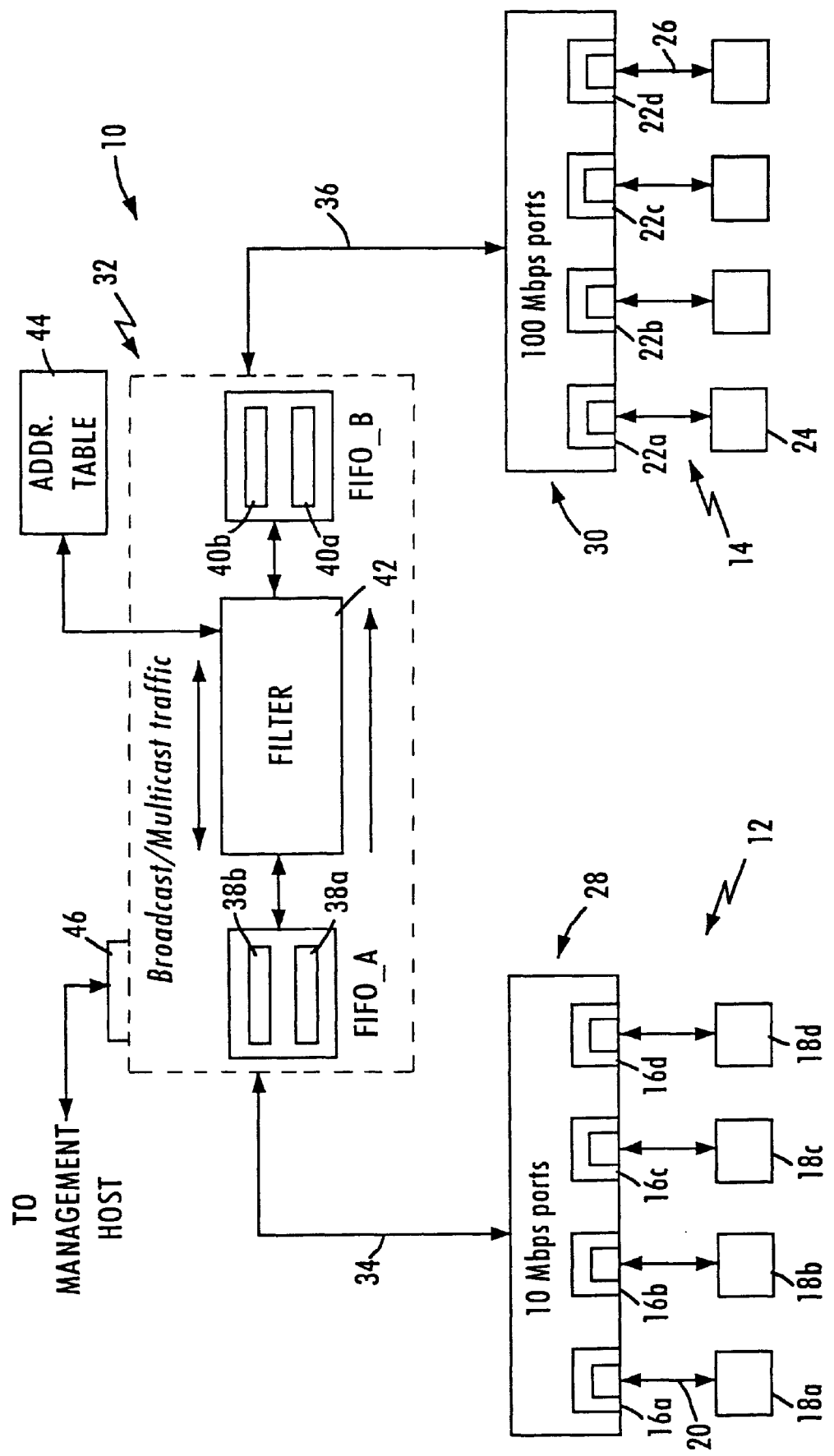
FIG. 1 is a block diagram of a network repeater for transmitting a data packet between a first and second media domain according to an embodiment of the present invention.

FIG. 1 is a block diagram of a network repeater 10 configured for transmitting data packets between a first network 12, having a first media domain having a first transmission rate, and a second network 14 having a second media domain having a second transmission rate according to an embodiment of the present invention. As shown in FIG. 1, the repeater 10 includes a first set of 10 Mb/s network ports 16, each configured for sending and receiving data packets according to IEEE 802.3 protocol between respective network nodes 18 via a 10 Mb/s half-duplex media 20. The repeater 10 also includes a second set of 100 Mb/s network ports 22 configured for sending and receiving data packets according to IEEE 802.3 protocol between respective network nodes 24 via a 100 Mb/s media 26. According to the disclosed embodiment, the networks 12 and 14 transmit data packets according to half-duplex protocol, although full-duplex protocol may be used for point to point communication between each network node and the corresponding port.

As shown in FIG. 1, the 10 Mb/s ports 16 are interconnected on a first PC board 28, and the 100 Mb ports 22 are interconnected on a second PC board 30, such that PC board 28 and PC board 30 each include a plurality of network ports configured for transmitting data packets in a corresponding media domain. Each PC board 28 and 30 also has a corresponding collision domain, such that the carrier sense and collision signal for each network are shared across the corresponding ports for each PC board.

The repeater 10 also includes a management board 32 that is interconnected with the PC boards 28 and 30 by first and second back plane connections 34 and 36, respectively. The management board 32 includes a first set of buffers 38 serving the 10 Mb/s ports 16, a second set of buffers 40 serving the 100 Mb/s ports 22, and a filter 42 configured for selectively supplying data packets between the first and second sets of buffers 38 and 40. The management board 32 also includes a management interface 46 configured for supplying management data (e.g. Management Information Base (MIB) objects) related to the operation of the repeater 32 to an external management host, including MIB objects describing the selective output of data packets by the filter 42. If desired, the PC boards 28 and 30 each also may be separately managed by the management host.

Each data packet received by a 10 Mb/s port 16 is supplied by the back plane connection 34 to an output buffer (e.g., receive FIFO) 38a. The data packets supplied by the filter 42 to the output buffer 38a are supplied to an input buffer 40a for the PC board 30. Hence, each data packet received by the network ports 16 is supplied via the output buffer 38a through the filter 42 to the input buffer 40a for transmission by each of the 100 Mb/s ports 22.

The buffers 38b and 40b are configured for transmitting data packets received by the 100 Mb/s ports 22 to the 10 Mb/s ports 16. Specifically, assuming a 100 Mb/s port 22 receives a data packet to be broadcast to all network ports, described below, the data packet is supplied by the back plane connection 36 to the output buffer 40b. Upon receiving the data packet from the output buffer 40b, the filter 42, recognizing the data packet as a broadcast data packet, supplies the data packet to the input buffer 38b for transmission by the 10 Mb/s network 12.

According to the disclosed embodiment, the filter 42 is configured for selectively outputting a data packet from the output buffer 40b to the 10 Mb/s ports 16 via the input buffer 38b based on the destination address specified in the data packet stored in the buffer 40b. Specifically, the filter 42 filters the data packet transmitted from the 100 Mb/s ports to the 10 Mb/s ports in order to avoid congestion of the 10 Mb/s ports. If desired, the filtering capability may also be performed in both directions. Since the 100 Mb/s network 14 has a higher data rate than the 10 Mb/s network 12, the selective passing of data packets by the filter 42 minimizes congestion in the input FIFO 38b. Specifically, the 100 Mb/s network 14 can remove data packets from the FIFO 40a at a faster rate than can be supplied by the FIFO 38a. Hence, network activity within the 10 Mb/s collision domain cannot cause congestion in the 100 Mb/s network. However, activity in the 100 Mb/s network 14 can easily fill up the buffer 38b faster than the 10 Mb/s network can remove the data packets. Hence, the filter 42 filters received data packets in the buffer 40b based on the respective destination addresses, and passes to the input buffer 38b only those data packets having either a multicast address, or a unicast address that matches the stored addresses in the address table 44. Specifically, the filter 42 compares the destination address of each packet in the buffer 40b with the source address values stored in the address table 44. If the destination address does not specify an address recognized by the address table 44 as being served by the 10 Mb/s ports 16, the data packet is discarded by the filter 42.

Figure 2:
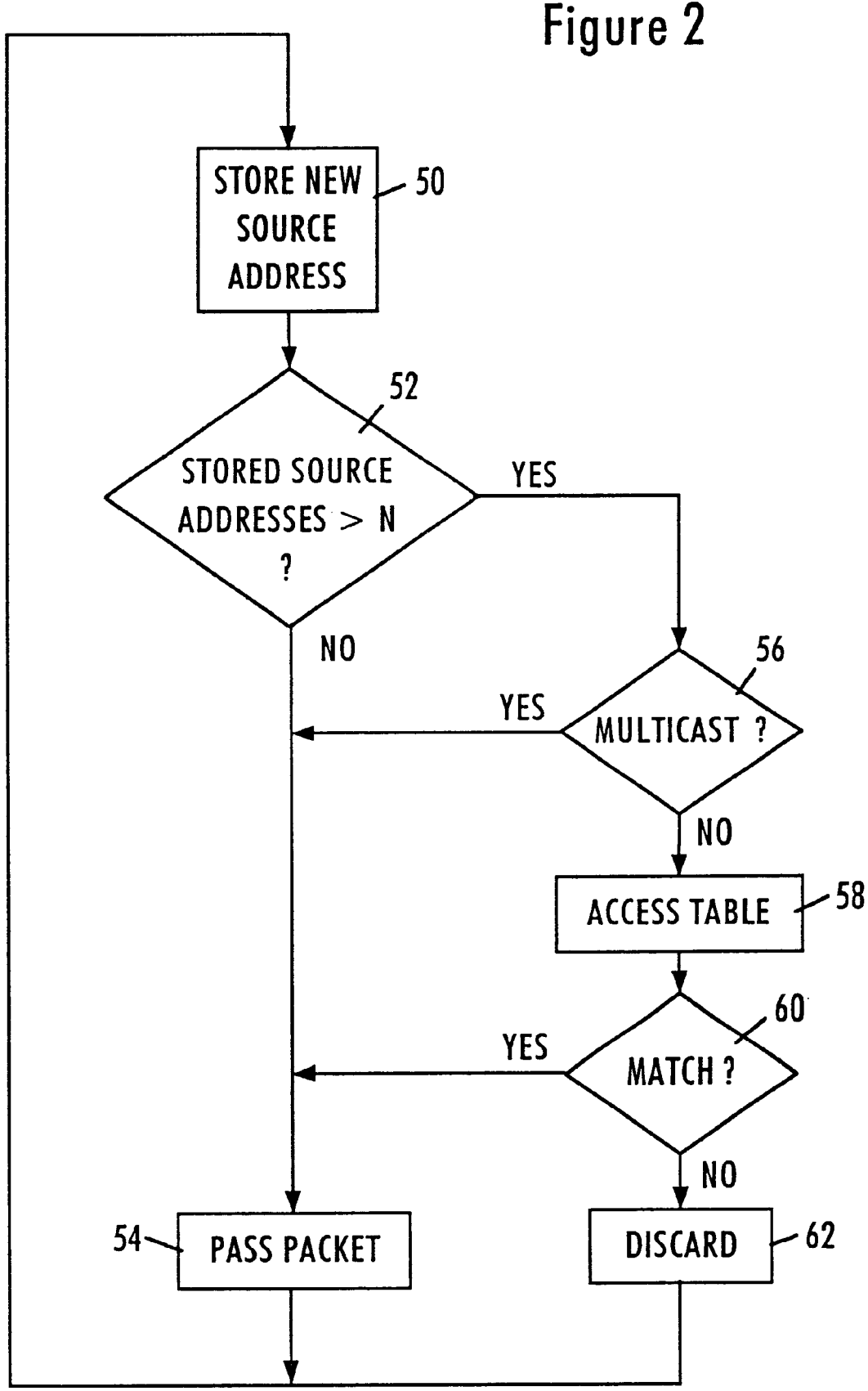
FIG. 2 is a flow diagram illustrating the method in the network repeater of FIG. 1 for selectively transmitting data packets between the first and second media according to an embodiment of the present invention.

FIG. 2 is a block diagram illustrating the method of selectively transmitting data packets by the filter 42 according to an embodiment of the present invention.

As shown in FIG. 2, the filter 42 monitors the data packets received in the buffer 38a, and stores any new source addresses in the address table in step 50 to perform learning of all the source addresses on the 10 Mb/s ports 16. Other techniques may be used to learn the addresses of the network nodes 18 in the 10 Mb/s network 12. The filter 42 in step 52 then checks for each data packet stored in the buffer 40b whether the number of stored source addresses in the address table 44 for the 10 Mb/s network 12 exceeds a prescribed value (N) corresponding to a certain populated number of the network nodes 18. For example, the prescribed number N may correspond to 50% of the total number of network nodes 18. If the number of stored source addresses in step 52 is less than the prescribed number N then the data packet stored in the buffer 40b is passed to the 10 Mb/s ports 16 in step 54 to minimize the number of dropped packets during population of the address table 44. As will be recognized in the art, population of the address table 44 should occur relatively quickly during initialization of the network, for example within the first 15 or 30 seconds.

Assuming normal operation of the repeater 10, i.e., after the address table has been populated by the addresses of the nodes 18 by reading the source addresses of data packets from the network 12, the filter 42 first checks for each data packet in the buffer 40b whether the destination address corresponds to a prescribed multicast address in step 56. If the stored destination address value in the data packet corresponds to a multicast address value, the filter 42 transfers the data packet from the buffer 40b to the buffer 38b for transmission into the 10 Mb/s domain without accessing the address table 44. If in step 56 the destination address does not correspond to a multicast address, the filter 42 accesses the table 44 in step 58, and compares the destination address value with the stored source address value stored in the address table 44. If in step 60 a match is found between the destination address value and one of the stored source address values, the filter 42 passes the data packet to the buffer 38b. However, if there is no match between the destination address and the stored address values, the data packet received from the 10 Mb/s network 14 is discarded in step 62.

According to the disclosed embodiment, a 10/100 repeater interface allows interconnection of 10 Mb/s and 100 Mb/s shared networks in an efficient manner. As described above, the disclosed arrangement reduces the necessary sizes of buffers in the repeater. Moreover, the disclosed arrangement eliminates the necessity of a more expensive external switch to interconnect the two shared networks. However, other network speeds greater than 100 Mb/s may be used, for example 200 Mb/s, 1000 Mb/s, etc.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A network repeater comprising:
   first network ports, each configured for outputting a first received data packet to the remaining first network ports, the first network ports sharing a first media domain having a first transmission rate;
   second network ports, each configured for outputting a second received data packet to the first network ports and the remaining second network ports, the second network ports sharing a second media domain having a second transmission rate less than the first transmission rate; and
   a filter receiving the first received data packet over the first media domain and selectively outputting the first received data packet to the second network ports for transmission on the second media domain based on a destination address specified in the first received data packet.

2. The repeater of claim 1, wherein the filter outputs the first received data packet to the second network ports in response to identification of the destination address as one of a multicast address and a network address of a network node served by the second network ports.

3. The repeater of claim 1, further comprising an address table configured for storing network addresses of network nodes served by the second network ports, the filter selectively outputting the first received data packet to the second network ports based on a comparison between the destination address and the stored network addresses in the address table.

4. The repeater of claim 3, wherein the address table stores a new address in response to detection thereof in a source address field of the second received data packet.

5. The repeater of claim 4, wherein the filter selectively passes the first received data packet to the second network ports until the address table stores at least a prescribed number of the network addresses of the network nodes served by the second network ports.

6. The repeater of claim 3, wherein the filter, in response to identification of the destination address as the multicast address, outputs the first received data packet independent of the stored network addresses in the address table.

7. The repeater of claim 1, further comprising:
   a first receive buffer configured for supplying the first received data packets from the respective first network ports to the filter;
   a second receive buffer configured for supplying the second received data packets from the respective second network ports to the filter; and
   a first transmit buffer configured for supplying the selectively output first received data packet from the filter to the second network ports.

8. The repeater of claim 1, further comprising a management interface for supplying selected data, related to the selective output of the first received data packet by the filter, to an external management host.

9. The repeater of claim 1, wherein the first transmission rate is 100 Mb/s and the second transmission rate is 10 Mb/s.

10. A network repeater comprising:
    a first network port having a first input buffer and first output buffer for receiving and sending data packets, respectively, on a first media having a first transmission;
    a second network port having a second input buffer and a second output port for receiving and sending data packets, respectively, on a second media having a second transmission rate less than the first transmission rate, the data packets in the second input buffer output to the first output buffer for transmission on the first media; and
    a filter selectively supplying each of the data packets from the first input buffer received over the first media to the second output buffer, for transmission on the second media, based on a destination address field in the corresponding data packet having an address value indicating transmission to a network node in communication with the second media.

11. The network repeater of claim 10, wherein the address value specifies one of a network address of the network node and a multicast address to at least the network node.

12. The network repeater of claim 10, further comprising an address table configured for storing network addresses of a plurality of the network nodes served by the second media, the filter selectively outputting said each data packet based on a comparison between the corresponding address value and the stored network addresses in the address table.

13. The network repeater of claim 12, wherein the address table stores a new address in response to detecting the new address in a source address field of one of the data packets received by the second input buffer.

14. The network repeater of claim 13, wherein the filter passes the data packets from the first input buffer to the second output buffer until the address table stores a prescribed number of said network addresses.

15. A method in a network repeater, comprising:
    receiving in a first network port a first data packet from a first media having a first transmission rate;
    supplying the first data packet to a second network port, coupled to a second media having a second transmission rate greater than the first transmission rate, for transmission on the second media;

receiving in the second network port a second data packet from the second media;

determining if the second data packet includes a destination address value specifying transmission of the second data packet to at least one network node in communication with the first media; and selectively supplying the second data packet from the second media to the first network port for transmission on the first media based on the destination address value determined as specifying transmission to the at least one network node.

16. The method of claim 15, further comprising storing a source address value from the first data packet in an address table, the determining step comprising comparing the destination address value with the source address values stored in the address table.

17. The method of claim 16, wherein the comparing step comprises comparing the destination address value with the stored source address values if a number of the stored source address values exceed a prescribed value.

18. The method of claim 17, wherein the selectively supplying step comprises supplying the second data packet to the first network port, independent of the destination address value, if the number of the stored source address values is less than the prescribed value.

19. The method of claim 16, wherein the comparing step comprises:

determining if the destination address value corresponds to a prescribed multicast address; and comparing the destination address value with the source values stored in the address table if the destination address value does not correspond to the prescribed multicast address.

* * * * *